Patented July 31, 1945

2,380,418

UNITED STATES PATENT OFFICE 2,380,418

TREATMENT OF FAT-SOLUBLE VITAMIN-CONTAINING MATERIALS

Bernard A. Dombrow, New York, N. Y., assignor to National Oil Products Company, Harrison, N. J., a corporation of New Jersey No Drawing. Application July 2, 1940, Serial No. 343,558

9 Claims. (Cl. 167—81)

This invention relates to the treatment of fat-soluble vitamin-containing oils, more particularly to a process for obtaining highly potent vitamin extracts from fat-soluble vitamin-containing oils.

As is well known, vegetable oils have been destearinated by dissolving the oils in solvents therefor and cooling the solutions to low temperatures. Application of this process to the refining of fat-soluble vitamin-containing oils effects removal of stearin and some other constituents and thus increases the vitamin potencies of the oils; however, this increase is ordinarily small. Since it is often desirable to increase the potencies of fat-soluble vitamin-containing oils to values substantially above those which may be obtained by ordinary destearination processes, there has been a considerable demand in the art for a process capable of effecting this result.

It has been proposed to recover the antirachitic principle from cod liver oil by a process involving extracting cod liver oil with cold ethyl alcohol, saponifying the fatty acids contained in the extract to obtain calcium soaps, and then dissolving the anti-rachitic principle out of the calcium soaps by washing with acetone. According to this proposal the alcoholic extract obtained from cod liver oil contains fatty acids, cholesterol, amines and bases, in addition to the anti-rachitic principle, but does not contain any vitamin A; this is confirmed by an article in the "Quarterly Journal of Pharmacy and Pharmacology" volume 1, pp. 539-545 (1928), in which it is stated that vitamin A is present in cod liver oil in a form insoluble in ethyl alcohol. Therefore, while the above proposal may be useful for preparing anti-rachitically active products, the resulting products do not contain substantial amounts of vitamin A, and hence are not particularly valuable for the preparation of vitamin A-containing materials; thus the demand for a process capable of obtaining highly potent vitamin extracts of vitamins A and D from fat-soluble vitamin-containing oils is not satisfied by this process.

It is an object of this invention to provide a simple and relatively inexpensive process for obtaining highly potent fat-soluble vitamin extracts from fat-soluble vitamin-containing oils.

A more specific object of this invention is to provide a process for obtaining highly potent extracts containing fat-soluble vitamins in naturally occurring form from fat-soluble vitamin-containing oils.

I have found that highly potent vitamin fractions may be extracted from fat-soluble vitamin-containing oils by contacting such oils with a suitable solvent and separating a highly potent vitamin extract dissolved in the solvent from the remainder of the oil. The process is preferably carried out by contacting a fat-soluble vitamin-containing oil with a suitable solvent at a temperature such that at least the major portion of the oil is miscible with the solvent, and then cooling the mixture, preferably to below 0° C., whereby a substantial portion of the oil separates from the solution. The soluble fraction extracted from the oil has a much higher vitamin A and D content than the portion which is insoluble in the solvent. Furthermore, the fraction extracted contains substantially all the natural anti-oxidants present in the oil, so that the highly potent extracts obtained in accordance with the invention are less susceptible to oxidation than the original oils. The invention thus provides a process for extracting the highly valuable vitamin constituents in concentrated form from ordinary fat-soluble vitamin-containing oils, along with natural anti-oxidants present in the oils so that the stability of the vitamins is considerably enhanced.

The solvent employed in accordance with the invention may be selected from a large number of aliphatic solvents found to be useful as a result of extensive experimentation; the choice of the solvent will depend to some extent upon the properties of the oil to be treated, as will become more evident from the detailed description hereinafter given. Results have indicated that the solvents preferably employed are members of well recognized chemical classes; it also has been found that the number of carbon atoms in the solvent to be used is a particularly important factor in determining the availability thereof for use in the practice of this invention. The following table sets forth the classes of solvents which have been found to be particularly useful in the practice of this invention:

Table I

1. Aliphatic and alicyclic monohydroxy alcohols containing from 3 to 6 carbon atoms.
2. Esters formed by the reaction of aliphatic and alicyclic alcohols with aliphatic monocarboxylic acids, said esters containing not more than 8 carbon atoms.
3. Aliphatic and alicyclic aldehydes containing not more than 6 carbon atoms.
4. Aliphatic ketones containing not more than 6 carbon atoms.

Solvents falling in the classes above listed are all liquid aliphatic organic compounds having the properties of being miscible with fatty oils at temperatures above room temperature, i. e. 20° to 25° C., and partially immiscible therewith at temperatures substantially below room temperature, and it has been found that solvents falling within this class of compounds may be used in the practice of this invention. In addition it will be noted that the preferred solvents possess relatively low freezing points.

In order to more fully illustrate the nature of the solvents which may be employed, a partial list thereof is herewith given; it is to be understood, however, that this list is not intended to be complete, but is merely illustrative of the solvents which may be employed. Thus it has been found that the following solvents may be used: n-propyl alcohol, isopropyl alcohol, n-butyl alcohol, n-amyl alcohol, isoamyl alcohol, secondary amyl alcohol, furfuryl alcohol, allyl alcohol, diacetone alcohol, acetyl methyl carbinol, β-hydroxy ethyl acetate, methyl formate, ethyl formate, ethyl acetate, methyl acetate, isopropyl acetate, glycol diformate, glycol diacetate, methyl levulinate, ethyl levulinate, methyl aceto acetate, ethyl aceto acetate, methyl furoate, vinyl acetate, furfural, propionaldehyde, crotonaldehyde, acetone, methyl ethyl ketone, diacetyl, acetonyl acetone, propylene chlorhydrin, and acetic anhydride. Mixtures of these solvents may also be used. It will be noted that all these solvents belong to that class of aliphatic organic compounds which have the properties of being miscible with fatty oils at temperatures above room temperature and partially immiscible therewith at temperatures substantially below room temperature; furthermore, it will be noted that the majority of these solvents have relatively low freezing points.

Occasionally it may be found that certain of the solvents hereinabove mentioned may be too miscible with some of the oils which may be treated by this invention to effect a separation of highly potent vitamin fractions therefrom; thus, for example, acetone is too miscible with some fat-soluble vitamin-containing oils to accomplish the purposes of this invention. However, this condition may be easily corrected by diluting the solvent either with a small amount of water or with some liquid aliphatic organic solvent relatively immiscible with fatty oils. In general it may be said that the effect of diluting any of the above solvents with water will be to render the solvents more immiscible with fatty oils, so that if difficulty is encountered in effecting proper separation of the highly potent extracts from the vitamin-containing oils, this difficulty may generally be overcome by the addition of a small amount of water to the solvent.

The solvents preferably employed in the practice of the invention are the aliphatic alcohols containing from 3 to 6 carbon atoms; of these solvents isopropanol and diacetone alcohol have proved to be the most successful. The presence of the hydroxyl group seems to impart to these solvents properties which make them particularly useful for the present purposes; whether this factor is due to some activating influence possessed by this group is not known, but it is believed that the presence of the hydroxyl group in such solvents makes them more capable of extracting vitamin A esters from oils containing such esters.

In carrying out the process of the invention the fat-soluble vitamin-containing oil to be treated is first mixed with the particular solvent to be employed. The oil treated may be any of the oils containing vitamins A, D, E or K known to the art, such as, for example, cod liver oil, shark liver oil, tuna liver oil, halibut liver oil, ling cod liver oil, sole liver oil, spear fish liver oil, sword fish liver oil, palm oil, wheat germ oil, etc. The relative proportion of oil to solvent in the mixture may vary widely; preferably the ratio of solvent to oil should be greater than one and in most cases mixtures containing between about 2% and about 25% oil are most suitable. This mixture may then be heated until the oil or the greater part thereof is dissolved in the solvent. The temperature to which the mixture of oil and solvent is heated may vary widely depending upon the nature of the ingredients contained in the mixture; in general it may be stated that it is inadvisable to heat fat-soluble vitamin-containing oils to temperatures in excess of 175° C. because of the relative instability of vitamin A at temperatures above this value. It is preferred to form the solution of oil in the solvent by first heating the solvent to be used to a predetermined temperature at which the oil to be added will substantially completely dissolve in the solvent, and then adding the oil to the solvent with agitation, the operation being carried out in an inert gas atmosphere.

The solution of the vitamin-containing oil in the solvent prepared as hereinabove described may then, in accordance with the process of the invention, be permitted to cool so as to effect a separation of the solution of the highly potent vitamin extract from the remainder of the oil. The temperature to which the solution is cooled may vary from about room temperature to as low as —70° C. or lower. It has been found, however, that it is preferable to cool the solution with agitation to temperatures somewhat below about 0° C., e. g. in the neighborhood of —18° C. Upon cooling, the solution separates into two layers. One layer consists chiefly of the portion of the original oil insoluble in the solvent at low temperatures. The vitamin content of this fraction is much less than that of the original oil. This fraction has a considerably lighter color than the original oil and also has lost much of the characteristic odor possessed by many fat-soluble vitamin-containing oils. It may be saponified in the usual manner to produce vitamin concentrates substantially devoid of obnoxious tastes and odors, or it may be re-extracted in accordance with this invention to recover additional high potency vitamin fractions therefrom. Other uses to which this fraction may be put will be evident to those skilled in the art.

The solvent layer obtained upon cooling the solution may be filtered and then treated to remove the solvent therefrom, e. g. by vacuum distillation, whereby an oil is recovered having a vitamin content far in excess of the amount contained in the original oil; the percentage increase in vitamin potency may be anywhere between about 50% and about 400%, the actual increase varying with the vitamin potency of the original oil. This extract also contains practically all of the natural anti-oxidants of the original oil in an unaltered active condition, so that it is much more resistant to oxidation than the original oil itself. The extract usually has a darker color than the original oil and possesses many of the characteristic odors thereof.

The vitamin extract thus obtained may be again treated with one of the solvents hereinabove mentioned in order to further step up the vitamin potency; it may also be treated to further increase its vitamin potency by subjecting it to extraction with methanol or ethanol as described in the copending application of Buxton, Serial No. 321,409, filed February 29, 1940, which has issued as Patent No. 2,347,460. This latter process involves mixing a fat-soluble vitamin-containing oil with methanol or ethanol, heating the mixture and then cooling the mass and recovering the alcoholic extract; it differs from the process herein described chiefly in that the solvents used do not become substantially completely miscible with the oil at the elevated temperatures. The extract obtained in accordance with this invention may be deodorized and decolorized by contact with decolorizing carbon.

The process of the invention may also be carried out by continuously contacting a body of a fat-soluble vitamin-containing oil with one of the above solvents at a relatively low temperature, e. g. around −18° C.; this method of operation effects a continuous extraction of a highly potent vitamin fraction from the oil. However, it is preferred to employ the batch method hereinabove described.

The following examples are illustrative of the invention; amounts are given in parts by weight.

Example I 1,000 parts of shark liver oil containing 119,000 A units per gram were mixed with 3200 parts of isopropanol and the mixture heated to 38° C. so as to form a homogeneous solution. The solution was slowly cooled with agitation to −18° C., whereby two layers formed. The solvent layer was separated and filtered; the insoluble residue was then redissolved in 3200 parts of isopropanol, the solution gradually cooled to −18° C. and filtered. The isopropanol extracts were combined and the isopropanol removed from a portion thereof by vacuum distillation. The fraction thus obtained had a vitamin A potency of about 274,000 A units per gram. This fraction was subjected to stability tests by maintaining it in contact with air at a constant temperature; after 36 days only 23% of the vitamin A contained in the fraction had oxidized, whereas 76% of the vitamin A contained in the original oil had oxidized in the same time.

A more highly potent extract was obtained by adding sufficient water to 200 parts of the combined extracts to dilute the alcohol from 98% isopropanol to 87.5% isopropanol, cooling the diluted mixture to −18° C., and separating the solvent layer. Upon filtration and removal of the isopropanol from the solvent layer, a fraction was obtained containing 340,000 A units per gram.

Example II 100 parts of cod liver oil containing 1760 A units and 200 D units per gram were mixed with 320 parts of isopropanol heated to 34° C., whereby a homogeneous solution was obtained. The mixture was then slowly cooled with agitation to a temperature of about −16° C., whereby two layers formed. The solvent layer was separated and filtered and the isopropanol was removed from the filtrate by vacuum distillation, whereby an oil containing 4420 A units and substantially more than 500 D units per gram was obtained.

Example III 50 parts of ling cod liver oil containing about 205,000 A units per gram were mixed with 360 parts of isopropanol heated to a temperature of about 35° C., whereby a homogeneous solution was obtained. The solution was then slowly cooled with agitation to a temperature of −16° C., whereby two layers formed. The solvent layer was separated and filtered and the isopropanol was removed from the filtrate by vacuum distillation, whereby an oil containing 300,000 A units per gram was recovered.

The insoluble material obtained in the extraction above described was redissolved in 320 parts of isopropanol heated to a temperature of about 35° C., and the solution again cooled to about −16° C. The solvent layer was separated, filtered, and the isopropanol was then distilled therefrom, whereby an oil containing about 302,000 A units per gram was obtained.

Example IV 125 parts of tuna liver oil containing 152,000 A units per gram were mixed with 700 parts of 99% isopropanol and the mixture heated to 32° C., whereby a homogeneous solution was obtained. The solution was then slowly cooled with agitation to −18° C., whereby two layers formed. The solvent layer was separated and filtered; the residue was extracted three more times with isopropanol as hereinabove described. The extracts thus obtained were combined and the isopropanol evaporated therefrom. The resulting oil contained 250,000 A units per gram.

Example V 100 parts of tuna liver oil containing 143,000 A units per gram were mixed with 560 parts of 91% isopropanol and the mixture heated to about 63° C., whereby practically all the oil dissolved in the isopropanol. The mixture was then slowly cooled with agitation to −18° C., whereby two layers formed. The solvent layer was separated and filtered; the residue was re-extracted with three additional portions of 91% isopropanol as hereinabove described. The extracts were combined and the isopropanol was then removed therefrom by vacuum distillation, whereby an oil containing 326,000 A units per gram was obtained.

Example VI 180 parts of cod liver oil containing 1210 A units per gram were mixed with 160 parts of 95% isopropanol and the mixture heated to 59° C., whereby a homogeneous solution was obtained. This solution was then cooled to room temperature, whereby two layers formed. The solvent layer was separated and filtered. The insoluble residue was then reextracted twice with additional portions of isopropanol as hereinabove described. The isopropanol was then distilled from each of the three extracts, whereby oils were obtained containing 2410, 1550, and 1660 A units per gram respectively.

Example VII 100 parts of dog fish liver oil containing 24,000 A units per gram were dissolved in 360 parts of diacetone alcohol heated to 45° C. The solution was slowly cooled with agitation to about −16° C., whereby two layers formed. The solvent layer was separated and filtered, and the diacetone alcohol evaporated from the filtrate. An oil was thereby obtained containing 74,100 A units per gram. The insoluble residue from the extraction was then re-extracted with 360 parts of hot diacetone alcohol as hereinabove described. An extract was obtained containing 61,200 A units per gram. The residue from the second extraction was again extracted with hot diacetone alcohol, whereby an extract containing 48,800 A units per gram was obtained.

Example VIII 100 parts of shark liver oil containing 116,000 A units per gram were mixed with 450 parts of acetone containing about 10% water. The mixture was heated to refluxing temperature and then slowly cooled with agitation to —18° C., whereby two layers formed. The solvent layer was separated and filtered. The residue was re-extracted in a similar manner and the extract combined with the first extract. The acetone and water were then removed by vacuum distillation, whereby an oil containing 270,000 A units per gram was obtained.

Example IX 10 parts of spear fish liver oil containing 279,500 A units per gram were dissolved in 490 parts of ethyl acetate. The solution was then slowly cooled with agitation to —70° C., whereby two layers formed. The solvent layer was separated, filtered and the ethyl acetate evaporated from the filtrate, whereby an oil containing 449,000 A units per gram was obtained.

It will be evident from the above description that the invention provides a process for the production of highly potent vitamin extracts of excellent stability from any fat-soluble vitamin-containing oil. The process is of particular advantage in that such highly potent extracts are obtained without subjecting the oil to processes causing chemical changes in the constituents thereof, and thus the process yields products having all the desirable attributes of natural vitamin-containing oils. Because of these advantages the invention will undoubtedly be of great interest to those engaged in the preparation of vitamin products.

It is to be understood that the vitamin contents of the oils and extracts are expressed in International vitamin units. Furthermore, the term "fat-soluble vitamins" is intended to include not only the vitamins themselves, but also the fat-soluble provitamins.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. A process for producing a fat-soluble vitamin concentrate from a fat-soluble vitamin-containing marine oil, which comprises mixing a fat-soluble vitamin-containing marine oil with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, to form a substantially homogeneous solution, cooling the mass to cause oil to separate out in a separate layer from the solvent solution, separating the solvent layer from the oil layer and recovering the extracted vitamin concentrate from the solvent solution thereof.

2. A process for producing a fat-soluble vitamin concentrate from a fish liver oil, which comprises mixing a fish liver oil with a solvent selected from the group consisting of aliphatic and alicyclic monohydroxy alcohols containing from 3 to 6 carbon atoms, esters formed by the reaction of aliphatic and alicyclic alcohols with aliphatic monocarboxylic acids, said esters containing not more than 8 carbon atoms, aliphatic and alicyclic aldehydes containing not more than 6 carbon atoms and aliphatic ketones containing not more than 6 carbon atoms, to form a substantially homogeneous solution, cooling the mass to cause oil to separate out in a separate layer from the solvent solution, separating the solvent layer from the oil layer and recovering the extracted vitamin concentrate from the solvent solution thereof.

3. A process for producing a fat-soluble vitamin concentrate from a fat-soluble vitamin-containing marine oil, which comprises mixing a fat-soluble vitamin-containing marine oil with an aliphatic monohydroxy alcohol containing from 3 to 6 carbon atoms to form a substantially homogeneous solution, cooling the mass to cause oil to separate out in a separate layer from the solvent solution, separating the solvent layer from the oil layer and recovering the extracted vitamin concentrate from the solvent solution thereof.

4. A process for obtaining a fat-soluble vitamin concentrate from a fish liver oil, which comprises mixing a fish liver oil with a propyl alcohol to form a substantially homogeneous solution, the ratio of alcohol to oil being greater than one, chilling the solution to cause oil to separate out in a separate layer from the alcohol solution, removing the alcohol layer and recovering a vitamin concentrate from said alcohol.

5. A process of producing a vitamin concentrate from oils containing vitamins A and D, which process comprises mixing isopropyl alcohol with the oils at a temperature at which the isopropyl alcohol and oils are substantially miscible, cooling the miscible mixture to a temperature sufficient to cause the major portion of the oil to separate, and separating the oil from the solvent and dissolved vitamins.

6. A process for obtaining highly potent vitamin extracts from fish liver oils, which comprises forming a substantially homogeneous solution of a fish liver oil in isopropanol at a temperature substantially above room temperature, the ratio of isopropanol to oil being greater than one, slowly cooling the solution to a temperature substantially below 0° C., separating the two layers formed upon cooling, and recovering a highly potent vitamin extract from the solution thereof in the isopropanol.

7. A process for obtaining highly potent vitamin extracts from fish liver oils, which comprises forming a substantially homogeneous solution of a fish liver oil in diacetone alcohol at a temperature substantially above room temperature, the ratio of alcohol to oil being greater than one, slowly cooling the solution to a temperature substantially below 0° C., separating the two layers formed upon cooling, and recovering a highly potent vitamin extract from the solution thereof in the diacetone alcohol.

8. A process for obtaining highly potent vitamin extracts from fish liver oils, which comprises forming a substantially homogeneous solution of a fish liver oil in a solvent comprising essentially acetone at a temperature substantially above room temperature, the ratio of acetone to oil being greater than one, slowly cooling the solution to a temperature substantially below 0° C., separating the two layers formed upon cooling, and recovering a highly potent vitamin extract from the solution thereof in the acetone.

9. A process for obtaining highly potent vitamin extracts from fish liver oils, which comprises mixing shark liver oil with isopropanol, the ratio of isopropanol to oil being greater than one, heating the mixture to a temperature substantially above room temperature to form a homogeneous solution, slowly cooling the solution to a temperature substantially below 0° C., separating the two layers formed upon cooling, and recovering a highly potent vitamin extract from the solution thereof in the isopropanol.

BERNARD A. DOMBROW.